United States Patent
Abril (12)

(10) Patent No.: US 6,716,460 B2
(45) Date of Patent: Apr. 6, 2004

(54) METHOD OF IMPROVING THE FLAVOR, TENDERNESS AND OVERALL CONSUMER ACCEPTABILITY OF POULTRY MEAT

(75) Inventor: Jesus Ruben Abril, Westminster, CO (US)

(73) Assignee: Martek Biosciences Corporation, Columbia, OH (US)

(*) Notice: Subject to any disclaimer, the term of this patent is extended or adjusted under 35 U.S.C. 154(b) by 0 days.

(21) Appl. No.: 10/146,660

(22) Filed: May 14, 2002

(65) Prior Publication Data

US 2003/0000477 A1 Jan. 2, 2003

Related U.S. Application Data

(60) Provisional application No. 60/290,898, filed on May 14, 2001.

(51) Int. Cl.$^7$ .................................................. A23K 1/00
(52) U.S. Cl. ............................. 426/2; 426/53; 426/601; 426/807
(58) Field of Search ............................. 426/2, 53, 601, 426/807

(56) References Cited

U.S. PATENT DOCUMENTS

| | | | | |
|---|---|---|---|---|
| 4,073,960 A | * | 2/1978 | Scott et al. | 426/580 |
| 4,918,104 A | * | 4/1990 | Weiss et al. | 514/560 |
| 5,130,242 A | * | 7/1992 | Barclay | 435/134 |
| 5,133,963 A | * | 7/1992 | Ise | 424/94.61 |
| 5,656,319 A | * | 8/1997 | Barclay | 426/574 |
| 6,054,147 A | * | 4/2000 | Barclay et al. | 426/2 |
| 6,060,087 A | * | 5/2000 | Cook et al. | 426/2 |

FOREIGN PATENT DOCUMENTS

| EP | 0 775 449 | 5/1997 | ............ A23K/1/18 |
|---|---|---|---|

OTHER PUBLICATIONS

Burley et al. (1989); Chapter 7: "Egg Yolk: Structure and Properties"; *The Avian Egg Chemistry and Biology*; John Wiley & Sons, New York; pp. 171–233.
Burley et al. (1989); Chapter 12: "Diet–Induced Changes to Eggs"; *The Avian Egg Chemistry and Biology*; John Wiley & Sons, New York; pp. 337–460.
Cook et al. (date unknown); Chapter 7: "Nutritive Value of Eggs"; *Egg Science and Technology*, pp. 92–108.
Cruickshank (1934); "Studies in Fat Metabolism in the Fowl I: The composition of the Egg Fat and Depot Fat of the Fowl as Affected by the Ingestion of Large Amounts of Different Fats"; *Biochem. J.*; pp. 965–977.
Jiang et al. (1991); "Effects of Feeding Flax and Two Types of Sunflower Seeds on Fatty Acid Compositions of Yolk Lipid Classes"; *Poultry Science*; 70; pp. 2467–2475.
March et al. (1989); "Linoleic Acid as a Mediator of Egg Size"; *Poultry Science*; 69; pp. 634–639.
Miller et al. (1969); "Comparative Effect of Herring, Menhaden, and Safflower Oils on Broiler Tissues Fatty Acid Composition and Flavor"; *Poultry Sci*; 48; pp. 2146–2157.
Navarro, J.G. et al. (1972); "Influence of Dietary Fish Meal on Egg Fatty Acid Composition"; *J. Sci. Fd. Agric.*; vol. 23, pp. 1287–1292.
Phetteplace et al. (1989); "Effects of Various Omega–3 Lipid Sources on Fatty Acid Composition in Chicken Tissues"; *J. Food Comp. Anal.* 2(2), pp. 104–117.
Rhodes (1958); "The Effect of Cod–Liver Oil in the Diet on the Composition of Hen's Egg Phospholipids"; *Biochem J.*; vol. 68, pp. 380–384.
Stadelman et al. (1989); "Factors Influencing Composition of the Hen's Egg"; *World's Poultry Science Journal*; vol. 45; pp. 247–253.
Watkins (1995). "The Nutritive Value of the Egg"; *Egg Science and Technology*, 4$^{th}$ Edition (Stadelman, W.J. and Cotterill, O., eds.), Food Products Press, New York, pp. 177–194.
Ayerza et al., *Poultry Science*, 81:826–837 (2002).
Enser, M., "Nutritional effects on meat flavour and stability" pp. 197–215, 1999, in *Poultry Meat Science* (eds. R.I. Richardson and G.C. Mead), CAB International.
Gonzalez–Esquerra et al., *Br. Poultry Sci.*, 41–481–488 (2000).
López–Ferrer et al., *Poultry Science*, 80:741–752 (2001).
López–Ferrer et al., *Arch. Geflügelk.*, 63(1):29–35 (1999).
Mooney et al., *J. Sci. Food. Agric.*, 78:134–140 (1998).
Wood et al., *Br. J. Nutri.*, 78(supp 1):S49–S60 (1997).

* cited by examiner

*Primary Examiner*—Chhaya Sayala
(74) *Attorney, Agent, or Firm*—Sheridan Ross P.C.

(57) ABSTRACT

A method is provided for improving the flavor, tenderness and/or consumer acceptability of the meat of domestic fowl. The method includes feeding low levels of long chain omega-3 and/or omega-6 HUFAs to the fowl, preferably during the later stages of the production cycle. The method can also result in improved nutrition value in the meat of the fowl.

28 Claims, No Drawings

METHOD OF IMPROVING THE FLAVOR, TENDERNESS AND OVERALL CONSUMER ACCEPTABILITY OF POULTRY MEAT

CROSS REFERENCE TO RELATED INVENTION

This application claims the benefit of priority under 35 U.S.C. §119(e) to U.S. Provisional Application Ser. No. 60/290,898, filed May 14, 2001. The entire disclosure of U.S. Provisional Application Serial No. 60/290,898 is incorporated herein by reference.

FIELD OF THE INVENTION

The present invention relates to the field of domestic bird production, and in particular, methods for feeding domestic birds to improve nutritional value, flavor, tenderness and/or consumer acceptability.

BACKGROUND OF THE INVENTION

There have been numerous studies on feeding long chain omega-3 fatty acids to broiler chickens. The purpose of these studies was primarily to enrich the meat with omega-3 fatty acids in order to provide consumers with a non-fish based source of these fatty acids in their diets. In general, large quantities ($\geq$ approximately 6 g) of long chain omega-3 fatty acids were fed to the birds during the production period. As used herein, the terms production period and production cycle referred to the life cycle of the bird until slaughter. The researchers reported increased levels of long chain omega-3 fatty acids in the meat and flavor scores the same as or worse than control (non-enriched) broiler meat. The inventors are unaware of any studies reporting improved tenderness, taste or consumer acceptability of broiler meat when poultry are fed long chain omega-3 and/or omega-6 fatty acids.

SUMMARY OF THE INVENTION

In accordance with the present invention, a feeding method is provided for improving at least one of flavor, tenderness or overall consumer acceptability of fowl meat. As used herein, the term fowl meat means the meat of a bird, and in particular a domesticated bird that is fed a controlled diet. The method of the present invention includes the steps of providing a concentrated source of at least one of omega-3 highly unsaturated fatty acid (HUFA) or omega-6 HUFA, and feeding the concentrated source of at least one of omega-3 HUFA or omega-6 HUFA to fowl in low concentrations resulting in improvements in at least one of flavor, tenderness or overall consumer acceptability of the meat of the fowl. An additional advantage of the present invention is that the nutritional value of the fowl meat can also be improved, for example, by increasing the level of omega-3 HUFA and/or omega-6 HUFA in the meat.

As used herein, the terms highly unsaturated fatty acid or HUFA mean a fatty acid with four or more unsaturated bonds. Examples of HUFAs include arachidonic acid (ARA (n-3), C20:4n-3 or ARA(n-6), C20:4n-6); stearidonic acid (SDA, C18:4n-3); eicosapentaenoic acid (EPA, C20:5n-3); docosahexaenoic acid (DHA, C22:6n-3) and docosapentaenoic acid (DPA(n-3), C22:5n-3 or DPA(n-6), C22:5n-6).

Preferably, a concentrated source of both omega-3 HUFA and omega-6 HUFA is provided and is fed to the fowl. Preferably, the ratio of omega-3 HUFA to omega-6 HUFA is in the range from about 2:1 to about 4:1. Preferably, the omega-3 HUFA is selected from the group consisting of DHA, EPA, DPA(n-3), ARA(n-3), SDA and mixtures thereof. Preferably the omega-6 HUFA is selected from the group consisting of ARA(n-6), DPA(n-6) and mixtures thereof. More preferably, DHA and DPA(n-6) are provided and are fed to the fowl. More preferably, DPA(n-3) and DPA(n-6) are provided and are fed to the fowl.

Preferably, the concentrated source of at least one of omega-3 HUFA or omega-6 HUFA is provided and fed to said fowl predominantly in the final 50 percent of the fowl production (life) cycle and more preferably, the concentrated source of at least one of omega-3 HUFA or omega-6 HUFA is provided and fed to said fowl predominantly in the final 25 percent of the fowl production (life) cycle. As used herein, the term predominantly means at least 50 percent, more preferably at least 66 percent and more preferably at least 75 percent. A feeding protocol is disclosed in U.S. Pat. No. 6,054,147 entitled "A Method For Increasing The Incorporation Efficiency Of Omega-3 Highly Unsaturated Fatty Acid In Poultry Meat", which is incorporated herein in its entirety by reference.

Preferably, the concentrated source of at least one of omega-3 HUFA or omega-6 HUFA is provided and fed to the fowl during its production cycle in an amount comprising from about 0.2 to about 2.4 grams of HUFA per kg of the final body weight of the fowl, more preferably in an amount comprising from about 0.4 to about 1.75 grams of HUFA per kg of the final body weight of the fowl, more preferably in an amount comprising from about 0.6 to about 1.25 grams of HUFA per kg of the final body weight of the fowl, and more preferably in an amount comprising from about 0.7 to about 1 grams of HUFA per kg of the final body weight of the fowl.

Preferably, at least 25 percent of the total fatty acids in the HUFA source added to the fowl ration and consumed by the fowl are omega-3 HUFA, omega-6 HUFA or mixtures thereof, more preferably at least 30 percent of the total fatty acids in the HUFA source added to the fowl ration and consumed by the fowl are omega-3 HUFA, omega-6 HUFA or mixtures thereof, more preferably at least 40 percent of the total fatty acids in the HUFA source added to the fowl ration and consumed by the fowl are omega-3 HUFA, omega-6 HUFA or mixtures thereof, and more preferably at least 50 percent of the total fatty acids in the HUFA source added to the fowl ration and consumed by the fowl are omega-3 HUFA, omega-6 HUFA or mixtures thereof.

Preferably, the domesticated bird or fowl is selected from the group consisting of broiler chickens, roaster chickens, turkeys, guinea hens, quail, ducks and geese, more preferably the domesticated bird or fowl is selected from the group consisting of broiler chickens, roaster chickens and turkeys.

Preferably, the omega-3 or omega-6 HUFA are provided in the fowl feed in the form of triglycerides, phospholipids, ethyl esters of the fatty acids or mixtures thereof.

Preferably, the omega-3 or omega-6 HUFA is from a microbial source, animal source (including fish oil or meal) or a genetically engineered plant source, and more preferably the omega-3 or omega-6 HUFA is from Schizochytrium sp or Crypthecodinium sp.

Preferably, the method of the present invention results in the enrichment of the meat in at least one HUFA, more preferably in the enrichment of the meat in at least one of DHA, SDA, EPA, DPA(n-3), DPA(n-6), ARA(n-3) or ARA (n-6), more preferably in the enrichment of the meat in at least one omega-3 fatty acid and more preferably in the enrichment of the meat in DHA.

DETAILED DESCRIPTION OF THE INVENTION

While conducting tests on enriching poultry meat with omega-3 fatty acids, the option of feeding much lower omega-3 and omega-6 long chain HUFA contents in their rations than had previously been tested was investigated. When a test panel evaluated cooked meat samples, it was unexpectedly found that the enriched meat had higher taste, tenderness, and overall acceptability scores than the control meat. Thus it was found that the meat could be significantly enriched with omega-3 fatty acids (with about 2 to 6 times the amount of long chain omega-3 fatty acids found in regular meat) by providing nutritionally significant levels of long chain omega-3 fatty acids. This is an additional benefit to consumers because of the well-known health benefits of long chain omega-3 fatty acids. At the same time however, the overall consumer acceptability of the meat as compared to regular meat could also be improved. Another benefit is that the overall polyunsaturated fat content of the meat is increased also improving the nutritional quality of the meat for consumers.

While not wishing to be bound by any theory, the benefit of low levels of long chain omega-3 and omega-6 HUFAs in poultry rations is most likely due to DHA and in this case DPA(n-6) substituting for shorter chain and less unsaturated fatty acids in the phospholipids of the meat. This substitution could improve the fluidity of the phospholipids membranes and directly impact the other functional properties of the meat. This effect of low levels of enrichment has not been observed previously possibly because of the emphasis on high levels of enrichment, higher levels of incorporation may lead to too much fluidity in the membranes adversely affecting functionality and/or cause enrichment of significant amounts of triglycerides in the meat which are less stable leading to organoleptic problems. Additionally many previous studies used less concentrated forms of omega-3 fatty acids such as fish oil that has about 20–25% omega-3 fatty acids as % total fatty acids. The other 75% of the oil is made up of saturated and monounsaturated and some polyunsaturated fatty acids that can also incorporate in the meat in an untargeted manner causing unwanted functionality problems. By using a more concentrated form of highly unsaturated fatty acids in the omega-3 and omega-6 series, in one embodiment about 55% of the fatty acids in the LCHUFA source were DHA(n-3) and DPA(n-6) fatty acids, the enrichment of the phospholipids can be directed more accurately to substitution by these highly unsaturated fatty acids. Additionally it is possible that use of the longest chain fatty acids in the omega-3 and omega-6 series provides fatty acids with the most potential for influencing the fluidity of the phospholipid-based membranes in the meat because of the high level of unsaturation in these fatty acids and because of the positive impact of the tertiary structure of these fatty acids (e.g. helical structure of DHA making it able to tightly pack in membranes like a saturated fatty acid but have the flexibility of a highly unsaturated fatty acid.

Preferred Embodiments

In the omega-3 series DHA, EPA, DPA, ARA and SDA can be used but more preferred are DHA and DPA(n-3). In the omega-6 series sources of ARA and DPA(n-6) can be used but DPA(n-6) is more preferred.

The HUFA supplement preferably contains long chain omega-3 fatty acids, more preferably DHA, more preferably DHA and a long chain omega-6 source, most preferably DHA(n-3) and DPA(n-6). Preferably, low levels of omega-3, preferably DHA, are fed to the fowl. Preferably, some long chain omega-6, preferably DPA(n-6), is fed to the fowl. Preferably, the ratio of omega-3 HUFA to omega-6 HUFA is in the range from about 2:1 to about 4:1. Preferably, the long chain omega-3 and omega-6 fatty acids are fed to the fowl during the last half of the production cycle and more preferably during the last 25% of the production cycle.

The amount of long chain omega-3 and omega-6 HUFAs fed during the production cycle are preferably in the range from about 0.2 to about 2.4 g/kg final body weight, more preferably from about 0.4 to about 1.75, more preferably from about 0.6 to about 1.25, and more preferably from about 0.7 to about 1.0 g/kg final body weight. Preferably, a concentrated form of long chain omega-3 and/or omega-6 polyunsaturated fatty acids is fed to the fowl.

Preferably, greater than 25% of the total fatty acids are omega-3 and/or omega-6 long chain HUFA, more preferably more than 30%, even more preferably 40%, and most preferably greater than 50%.

EXAMPLE

Example 1.

Effect of low levels of long chain omega-3 and omega-6 fatty acids on the taste, tenderness and overall consumer acceptability of poultry meat.

A study was conducted to determine the effect of feeding low levels of long chain omega-3 and omega-6 fatty acids on the organoleptic properties of meat and determine the enrichment levels of these fatty acids in the resulting meat. Broiler chickens were selected as the experimental production animal.

The broiler strain utilized was Avian (female)×Ross (male) cross. This strain has a capacity for high performance and represents normal genetic stock found in the poultry industry.

Broilers were housed at hatch, sexed at the research site, and immediately began the dietary treatments. The pens provided 0.75 ft$^2$ per broiler chicken. The trial ran from 0–49 days of age with the long chain omega-3/omega-6 fatty acid source added to the rations from day 36-day 49. There were three treatments in the trial with 10 replications per treatment (70 broilers per replication) for a total of 2100 birds on study. The treatments are outlined in Table 1. The broilers were blocked by randomizing weights across all pens ensuring that weights would be equal among pens.

Commercial type feeds were formulated and fed (crumbles in starter ration and pelleted in grower and finisher rations) (Table 2.). Normal rations (without test material) were fed from 0–35 days of age. Test material was added to the rations from day 36 to market age (49 days of age) during the Grower II and Finisher phases of the study. Formulations were prepared with the following considerations:

1) treatments were formulated to be isonitrogenous and isocaloric as well as iso- all other nutrients.
2) Grower II ration used the same formulation as Grower I but with the added source of DHA and DPA(n-6).
3) The diets conformed to industry standards and met or exceeded the nutritional requirements set forth in: Nutrient Requirements of Poultry, 9$^{th}$ rev. ed., National Research Council, 1998.
4) Sacox (Salinomycin (60) manufactured by Hoechst: 60 grams per ton of feed) was used in the starter and grower rations and BMD (manufactured by Alfarma: 50 grams per ton of feed) was used in all feeds.

The nutrient requirements for the formulated feeds are summarized in Table 3.

Body weights and feed consumption were measured during the study. At the end of the trial the animals were sacrificed and samples of breast and thigh meat collected for fatty acid analysis by gas chromatography. Breast and thigh samples were also frozen and sent to an independent university laboratory (Dept. of Food Science, Colorado State University) for organoleptic analysis by a consumer taste panel. Samples of meat were sent to the University of Colorado Dept. of Food Science for organoleptic analysis.

For the consumer taste panel (100 untrained panelists) a Rank Order of Preference Test was used to evaluate the samples. Meat testing is disclosed in the AMSA Research Guide for Cookery, Sensory Evaluation and Instrumental Tenderness Measurements of Fresh Meat (1995), which is incorporated herein by reference in its entirety. A limit of 4 samples for analysis were selected to prevent panel member sample over-load. Frozen meat samples were thawed and then baked at 350° F. to an endpoint temperature of 165° F. (internal). Approximately 7g samples of each treatment were presented to panelists simultaneously in 60 g portion cups. Scorecards were attached. The panelists were asked to rate the samples for flavor, tenderness and overall acceptability. For each characteristic there was a rating scale of 1–4: 1=like best; 2=like moderately; 3=like slightly; 4=like least. The results were analyzed by Chi square analysis. For the chicken breast samples, the results indicated a Rank order of Preference of treatment 2, 4, 1 (control). Results were significant at the $p<0.05$ level for these comparisons. For the chicken thigh samples, the results indicated a Rank order of Preference of treatment 2, 4, 1 (control). Results were significant at the $p<0.05$ level for these comparisons. In summary, the results indicated that adding HUFAs to the broiler rations increased taste, tenderness and overall acceptability of the breast meat and increased tenderness in the thigh meat without compromising taste or overall acceptability.

TABLE 1

Study design. The DHA(n-3) and DPA(n-6) fatty acids were added as a poultry feed ingredient in the form of drum-dried Schizochytrium sp. cells containing approximately 22.7% DHA and 7.6% DPA(n-6) as % dry weight.

| Treatment # | Amount of long chain omega-3 and omega-6 fatty acids fed to the chickens. |
|---|---|
| 1 | control; 0.0 g DHA + 0.0 g DPA(n-6) (vitamin E level = 15 IU/kg feed) |
| 2 | 1.33 g DHA + 0.44 g DPA(n-6): 85% fed in grower II/15% in finisher (vitamin E = 23 IU/kg feed) |
| 3 | 4.0 g DHA + 1.33 g DPA(n-6): 85% fed in grower II/15% in finisher (vitamin E = 23 IU/kg feed) |

TABLE 2

Feeding program

| Ration | Fed on Trial Days |
|---|---|
| Starter | 0–21 |
| Grower I | 22–35 |
| Grower II | 36–43 |
| Finisher | 44–49 |

TABLE 3

Nutrient requirement for the formulated feeds.

| Nutrient/Ingredient | Starter Ration | Grower I & II Ration | Finisher Ration |
|---|---|---|---|
| Energy (kcal/kg) | 3086 | 3142 | 3197 |
| Protein (%) | 20.0 | 19.0 | 18.0 |
| Lysine (%) available | 1.20 | 1.05 | 0.95 |
| Meth + Cyst (5) | 1.00 | 0.85 | 0.80 |
| Calcium (%) | 0.90 | 0.84 | 0.80 |
| Total Phosphorus (%) | 0.45 | 0.42 | 0.40 |
| Sodium (%) | 0.20 | 0.18 | 0.15 |
| Choline (%) | 1.35 | 1.15 | 0.95 |
| Animal fat for dust restriction | min 1% | min 1% | min 1% |

TABLE 4

DHA enrichment levels (mg/100 g meat) obtained in the poultry meat.

|  | Breast | Thigh |
|---|---|---|
| Treatment 1 (Control) | 10.8 | 19.1 |
| Treatment 1 | 37.4 | 75.6 |
| Treatment 2 | 61.1 | 79.2 |

TABLE 5

Consumer Taste Panel Results

Least significant Differences for Flavor of Chicken Breasts

| Chicken Breasts | Flavor | Comparisons | Significance |
|---|---|---|---|
| Treatment 1 (control) | 249 | | |
| Treatment 2 | 212 | 249 − 212 = 37 (Tmt 1 vs. 2) | p < 0.05 |
| Treatment 3 | 237 | 249 − 237 = 12 (Tmt 1 vs. 3) | N.S. |
| Chi square | 29.91 | | |

For flavor, rank order of preference - Treatment 2, 3, 1 (control)

Least significant Differences for Tenderness of Chicken Breasts

| Chicken Breasts | Tenderness | Comparisons | Significance |
|---|---|---|---|
| Treatment 1 (control) | 265 | | |
| Treatment 2 | 204 | 265 − 204 = 61 (Tmt 1 vs. 2) | p < 0.05 |
| Treatment 3 | 225 | 265 − 225 = 40 (Tmt 1 vs. 3) | p < 0.05 |
| Chi square | 36.61 | | |

For tenderness, rank order of preference - Treatment 2, 3, 1 (control)

Least significant Differences for Overall Acceptability of Chicken Breasts

| Chicken Breasts | Overall Acceptability | Comparisons | Significance |
|---|---|---|---|
| Treatment 1 (control) | 257 | | |
| Treatment 2 | 207 | 257 − 207 = 50 (Tmt 1 vs. 2) | p < 0.05 |
| Treatment 3 | 229 | 257 − 229 = 28 (Tmt 1 vs. 3) | N.S. |
| Chi square | 33.53 | | |

For overall acceptability, rank order of preference - Treatment 2, 3, 1 (control)

TABLE 5-continued

Consumer Taste Panel Results

Least Significant Differences for Flavor of Chicken Thighs

| Chicken Thighs | Flavor | Comparisons | Significance |
|---|---|---|---|
| Treatment 1 (control) | 251 | | |
| Treatment 2 | 219 | 251 − 219 = 32 (Tmt 1 vs. 2) | N.S. |
| Treatment 3 | 227 | 251 − 227 = 24 (Tmt 1 vs. 3) | N.S. |
| Chi square | 25.80 | | |

For flavor, rank order of preference - Treatment 2, 3, 1 (control)

Least Significant Differences for Tenderness of Chicken Thighs

| Chicken Thighs | Tenderness | Comparisons | Significance |
|---|---|---|---|
| Treatment 1 (control) | 254 | | |
| Treatment 2 | 200 | 254 − 200 = 54 (Tmt 1 vs. 2) | $p < 0.05$ |
| Treatment 3 | 230 | 254 − 230 = 24 (Tmt 1 vs. 3) | N.S. |
| Chi square | 43.61 | | |

For tenderness, rank order of preference - Treatment 2, 3, 1 (control)

Least significant Differences of Overall Acceptability of Chicken Thighs

| Chicken Thighs | Overall Acceptability | Comparisons | Significance |
|---|---|---|---|
| Treatment 1 (control) | 244 | | |
| Treatment 2 | 213 | 244 − 213 = 31 (Tmt 1 vs. 2) | N.S. |
| Treatment 3 | 224 | 244 − 224 = 20 (Tmt 1 vs. 3) | N.S. |
| Chi square | 41.24 | | |

For overall acceptability, rank order of preference - Treatment 2, 3, 1 (control)

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

I claim:

1. A feeding method for improving flavor, tenderness and overall consumer acceptability of fowl meat comprising the steps:

(a) providing a concentrated source of at least one of omega-3 highly unsaturated fatty acid (HUFA) or amega-6 HUFA;

(b) feeding said concentrated source of at least one of omega-3 HUFA or omega-6 HUFA to fowl in an amount comprising from about 0.2 to about 1.25 grams of HUFA per Kg of the final body weight of the fowl resulting in improvements in flavor, tenderness and overall consumer acceptability of the meat of said fowl.

2. The method of claim 1 wherein a concentrated source of both omega-3 HUFA and omega-6 HUFA is provided and is fed to said fowl.

3. The method of claim 1 wherein said omega-3 HUFA is selected from the group consisting of DHA, EPA, DPA(n-3), ARA(n-3), SDA and mixtures thereof.

4. The method of claim 1 wherein said omega-6 HUFA is selected from the group consisting of ARA(n-6), DPA(n-6) and mixtures thereof.

5. The method of claim 2 wherein DHA and DPA(n-6) are provided and are fed to said fowl.

6. The method of claim 2 wherein DPA(n-3) and DPA(n-6) are provided and are fed to said fowl.

7. The method of claim 1 wherein said concentrated source of at least one of omega-3 HUFA or omega-6 HUFA is provided and fed to said fowl predominantly in the final 50 percent of the fowl production cycle.

8. The method of claim 1 wherein said concentrated source of at least one of omega-3 HUFA or omega-6 HUFA is provided and fed to said fowl predominantly in the final 25 percent of the fowl production cycle.

9. The method of claim 1 wherein said concentrated source of at least one of omega-3 HUFA or omega-6 HUFA is provided and fed to said fowl in an amount comprising from about 0.4 to about 1.25 grams of HUFA per kg of the final body weight of the fowl.

10. The method of claim 1 wherein said concentrated source of at least one of omega-3 HUFA or omega-6 HUFA is provided and fed to said fowl in an amount comprising from about 0.6 to about 1.25 grams of HUFA per kg of the final body weight of the fowl.

11. The method of claim 1 wherein said concentrated source of at least one of omega-3 HUFA or omega-6 HUFA is provided and fed to said fowl in an amount comprising from about 0.7 to about 1 grams of HUFA per kg of the final body weight of the fowl.

12. The method of claim 1 wherein at least 25 percent of the total fatty acids in the HUFA source added to the fowl ration and consumed by the fowl are omega-3 HUFA, omega-6 HUFA or mixtures thereof.

13. The method of claim 1 wherein at least 30 percent of the total fatty acids in the HUFA source added to the fowl ration and consumed by the fowl are omega-3 HUFA, omega-6 HUFA or mixtures thereof.

14. The method of claim 1 wherein at least 40 percent of the total fatty acids in the HUFA source added to the fowl ration and consumed by the fowl are omega-3 HUFA, omega-6 HUFA or mixtures thereof .

15. The method of claim 1 wherein at least 50 percent of the total fatty acids in the HUFA source added to the fowl ration and consumed by the fowl are omega-3 HUFA, omega-6 HUFA or mixtures thereof.

16. The method of claim 1 wherein said fowl is selected from the group consisting of broiler chickens, roaster chickens, turkeys, guinea hens, quail, ducks and geese.

17. The method of claim 1 wherein said fowl is selected from the group consisting of broiler chickens, roaster chickens and turkeys.

18. The method of claim 2 wherein said omega-3 or omega-6 HUFA are provided in the fowl feed in the form of triglycerides, phospholipids, ethyl esters of the fatty acids or mixtures thereof.

19. The method of claim 2 wherein said omega-3 or omega-6 HUFA is from a microbial source, animal source or a genetically engineered plant source.

20. The method of claim 19 wherein said omega-3 or omega-6 HUFA is from Schizochytrium sp or Crypthecodinium sp.

21. The method of claim 1, wherein said method further results in the enrichment of the meat in at least one HUFA.

22. The method of claim 1, wherein said method further results in the enrichment of the meat in at least one of DHA, SDA, EPA, DPA(n-3), DPA(n-6), ARA(n-3) or ARA(n-6).

23. The method of claim 1, wherein said method further results in the enrichment of the meat in at least one omega-3 fatty acid.

24. The method of claim 1, wherein said method further results in the enrichment of the meat in DHA.

25. The method of claim 2, wherein the ratio of omega-3 HUFA to omega-6 HUFA is in the range from about 2:1 to about 4:1.

26. The method of claim 1, wherein a Rank Order of Preference Test is used to evaluate at least one of flavor, tenderness or overall consumer acceptability of the meat of said fowl.

27. A feeding method for improving flavor, tenderness and overall consumer acceptability of fowl meat comprising the steps:
(a) providing a concentrated source of at least one of omega-3 highly unsaturated fatty acid (HUFA) or omega-6 HUFA;
(b) feeding said concentrated source of at least one of omega-3 HUFA or omega-6 HUFA to said fowl in an amount comprising from about 0.2 to about 1.25 grams of HUFA per kg of the final body weight of the fowl during the production cycle of said fowl resulting in improvements in flavor, tenderness and overall consumer acceptability of the meat of said fowl.

28. A feeding method for improving at least one of flavor, tenderness or overall consumer acceptability of fowl meat comprising the steps:
(a) providing a concentrated source of omega-3 highly unsaturated fatty acid (HUFA) and omega-6 HUFA;
(b) feeding said concentrated source of omega-3 HUFA and omega-6 HUFA to said fowl in an amount comprising from about 0.2 to about 2.4 grams of HUFA per kg of the final body weight of the fowl during the production cycle of said fowl resulting in improvements in at least one of flavor, tenderness or overall consumer acceptability of the meat of said fowl.

* * * * *